United States Patent
Ono et al.

(10) Patent No.: US 9,904,299 B2
(45) Date of Patent: Feb. 27, 2018

(54) GAS SUPPLY CONTROL METHOD

(71) Applicant: Tokyo Electron Limited, Tokyo (JP)

(72) Inventors: Kumiko Ono, Miyagi (JP); Hiroshi Tsujimoto, Miyagi (JP); Atsushi Sawachi, Miyagi (JP); Norihiko Amikura, Miyagi (JP); Norikazu Sasaki, Miyagi (JP); Yoshitaka Kawaguchi, Miyagi (JP)

(73) Assignee: Tokyo Electron Limited, Tokyo (JP)

( * ) Notice: Subject to any disclaimer, the term of this patent is extended or adjusted under 35 U.S.C. 154(b) by 122 days.

(21) Appl. No.: 15/080,692

(22) Filed: Mar. 25, 2016

(65) Prior Publication Data

US 2016/0299514 A1 Oct. 13, 2016

(30) Foreign Application Priority Data

Apr. 8, 2015 (JP) .................................. 2015-079131
Dec. 22, 2015 (JP) .................................. 2015-249894

(51) Int. Cl.
*F16K 31/02* (2006.01)
*G05D 7/06* (2006.01)

(52) U.S. Cl.
CPC .................................. *G05D 7/0647* (2013.01)

(58) Field of Classification Search
CPC ... G05D 7/0647; G05D 16/20; H01J 37/3244; H01J 37/32449; H01J 37/32009; H01J 37/32834; H01L 21/67069; H01L 21/67253; C23C 16/4414

USPC .............. 137/487.5, 12, 487, 488, 489, 613; 156/345.15, 345.24, 345.26; 118/715; 73/861.42

See application file for complete search history.

(56) References Cited

U.S. PATENT DOCUMENTS

| | | | | |
|---|---|---|---|---|
| 5,669,408 A * | 9/1997 | Nishino | ............... | G05D 7/0635 137/486 |
| 5,816,285 A * | 10/1998 | Ohmi | ................... | G05D 7/0635 137/486 |
| 6,012,474 A * | 1/2000 | Takamoto | ............ | G05D 7/0635 137/14 |
| 6,178,995 B1 * | 1/2001 | Ohmi | ................... | G05D 7/0635 137/486 |

(Continued)

FOREIGN PATENT DOCUMENTS

JP 2004-005308 1/2004

*Primary Examiner* — Minh Le
(74) *Attorney, Agent, or Firm* — IPUSA, PLLC

(57) ABSTRACT

A gas supply control method uses a pressure control flowmeter and first and second valves provided upstream and downstream, respectively, of the pressure control flowmeter in a gas supply line. The pressure control flowmeter includes a control valve and an orifice. The gas supply control method includes maintaining a pressure $P_1$ of a first gas supply pipe between the orifice and the control valve and a pressure $P_2$ of a second gas supply pipe between the orifice and the second valve so as to satisfy $P_1 > 2 \times P_2$. The supply of gas is controlled by controlling the opening and closing of the second valve with the first valve being open and the control valve being controlled. A volume $V_1$ of the first gas supply pipe and a volume $V_2$ of the second gas supply pipe have a relationship of $V_1/V_2 \geq 9$.

6 Claims, 13 Drawing Sheets

(56) References Cited

U.S. PATENT DOCUMENTS

| | | | | |
|---|---|---|---|---|
| 6,210,482 | B1* | 4/2001 | Kitayama | C23C 16/44 118/715 |
| 6,539,968 | B1* | 4/2003 | White | G05D 7/0635 137/10 |
| 6,964,279 | B2* | 11/2005 | Ohmi | G05D 7/0635 137/486 |
| 8,944,095 | B2* | 2/2015 | Okabe | C23C 16/00 137/486 |
| 9,574,917 | B2* | 2/2017 | Hidaka | G01F 1/363 |
| 2004/0144178 | A1* | 7/2004 | Ohmi | G01D 3/022 73/708 |
| 2010/0192854 | A1* | 8/2010 | Nishino | C23C 16/455 118/692 |
| 2016/0181071 | A1* | 6/2016 | Yamaguchi | F17D 1/00 156/345.26 |
| 2016/0349763 | A1* | 12/2016 | Hirose | G05D 7/0635 |
| 2016/0372348 | A1* | 12/2016 | Sawachi | H01J 37/32009 |

* cited by examiner

US 9,904,299 B2

GAS SUPPLY CONTROL METHOD

CROSS-REFERENCE TO RELATED APPLICATIONS

This application is based upon and claims the benefit of priority of Japanese Patent Application Nos. 2015-079131, filed on Apr. 8, 2015, and 2015-249894, filed on Dec. 22, 2015, the entire contents of which are incorporated herein by reference.

BACKGROUND OF THE INVENTION

1. Field of the Invention

The present invention relates to gas supply control methods

2. Description of the Related Art

According to semiconductor manufacturing apparatuses, substrates are subjected to microfabrication by the action of a desired gas supplied into a chamber. As an apparatus used to control the flow rate of the supplied gas, for example, a pressure-type flow rate control system illustrated in Japanese Laid-Open Patent Application No. 2004-5308 has been proposed. The pressure-type flow rate control system is connected to a gas supply pipe for supplying gas from a gas supply source into a chamber, and controls the flow rate of gas flowing through the gas supply pipe by controlling the degree of opening of a control valve.

SUMMARY OF THE INVENTION

According to an aspect of the present invention, a gas supply control method uses a pressure control flowmeter and first and second valves provided upstream and downstream, respectively, of the pressure control flowmeter in a gas supply line. The pressure control flowmeter includes a control valve and an orifice. The gas supply control method includes maintaining a pressure $P_1$ of a first gas supply pipe between the orifice and the control valve and a pressure $P_2$ of a second gas supply pipe between the orifice and the second valve so as to satisfy $P_1 > 2 \times P_2$. The supply of gas is controlled by controlling the opening and closing of the second valve with the first valve being open and the control valve being controlled. A volume $V_1$ of the first gas supply pipe and a volume $V_2$ of the second gas supply pipe have a relationship of $V_1/V_2 \geq 9$.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
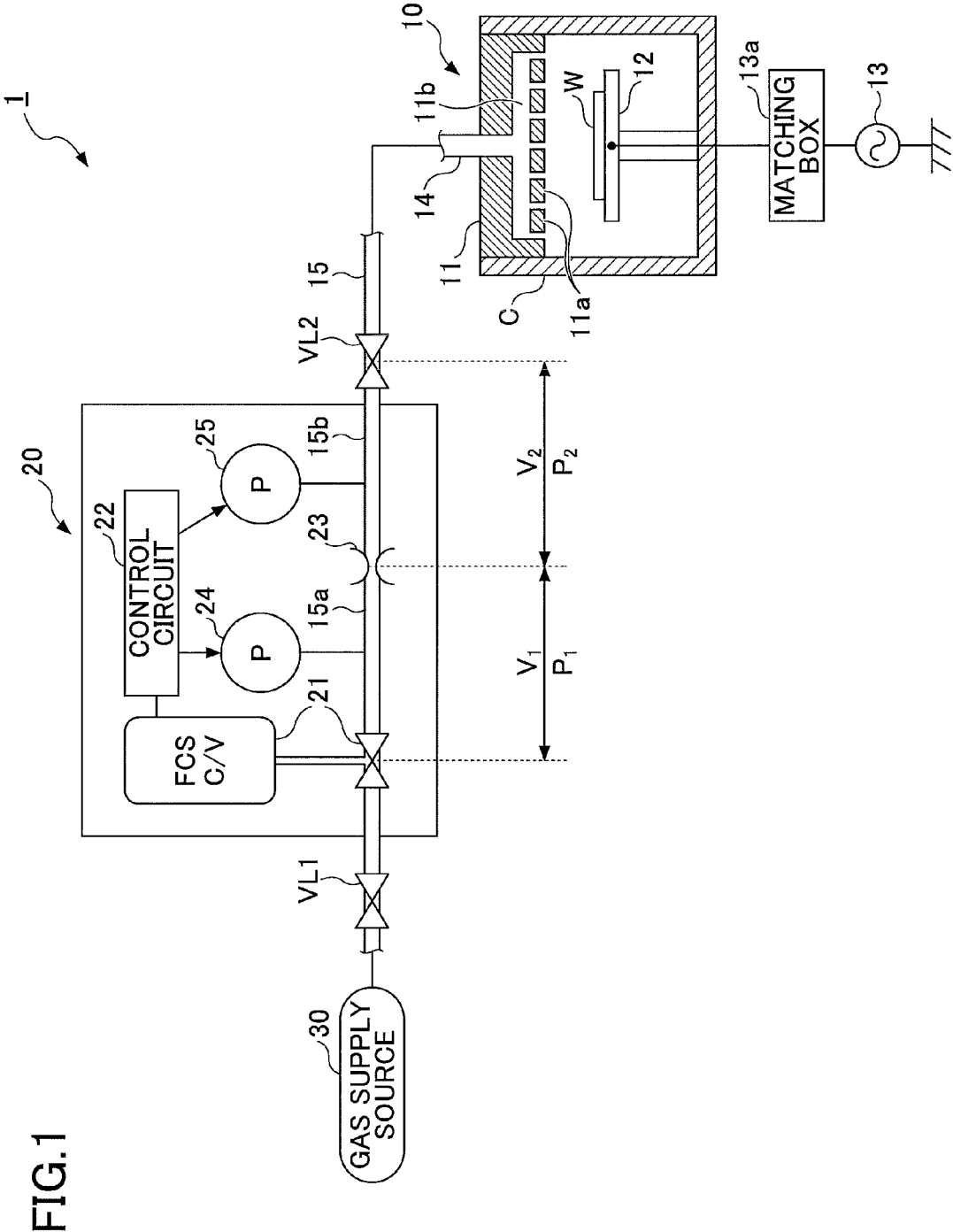
FIG. 1 is a diagram depicting an overall configuration of a gas supply control system according to an embodiment.

According to the control of a control valve described in Japanese Laid-Open Patent Application No. 2004-5308, it takes time before gas is supplied into the chamber at a desired flow rate, which contributes to deterioration of the throughput of semiconductor manufacture. Furthermore, because the flow rate of gas supplied into the chamber is uncontrolled before the gas is supplied into the chamber at a desired flow rate, microfabrication of substrates is not satisfactorily performed, which serves as a factor that affects the characteristics of semiconductors.

According to an aspect of the present invention, it is possible to promptly supply gas into a chamber at a desired flow rate.

One or more embodiments of the present invention description are described below with reference to the accompanying drawings. In the specification and drawings, the same or substantially the same elements are referred to using the same reference numeral, and a description thereof is not repeated.

First, an overall configuration of a gas supply control system 1 according to an embodiment of the present invention is described with reference to FIG. 1. The gas supply control system 1 controls gas supplied to a semiconductor manufacturing apparatus 10.

The semiconductor manufacturing apparatus 10 includes a cylindrical chamber C formed of aluminum having an anodized surface. The chamber C is grounded. A loading table 12 is provided in the chamber C. A wafer W is loaded onto the loading table 12.

A high-frequency power supply 13 for exciting a plasma is connected to the loading table 12 via a matching box 13a.

For example, the high-frequency power supply 13 applies high-frequency electric power of a frequency suitable for generating a plasma in the chamber C, for example, 60 MHz, to the loading table 12. Thus, the loading table 12 serves as a lower electrode as well as a table for loading the wafer W. The matching box 13a matches load impedance to the internal (or output) impedance of the high-frequency power supply 13. The matching box 13a operates so that the internal impedance of the high-frequency power supply 13 and the load impedance apparently match when a plasma is generated in the chamber C.

The ceiling of the chamber C is provided with a gas shower head 11 serving as an upper electrode. As a result, high-frequency electric power from the high-frequency power supply 13 is capacitively applied between the loading table 12 and the gas shower head 11. Gas is introduced from a gas introduction port 14 of the gas shower head 11 and passes through a gas buffer space 11b to be supplied into the chamber C through multiple gas passage holes 11a.

The semiconductor manufacturing apparatus 10 performs microfabrication on the wafer W by the action of a desired gas supplied into the chamber C. A pressure-type flow rate control system 20 is used to control the flow rate of the supplied gas.

The pressure-type flow rate control system 20 is connected to a gas supply line 15 for supplying gas from a gas supply source 30 to the semiconductor manufacturing apparatus 10. The pressure-type flow rate control system 20 controls the flow rate of gas that flows through the gas supply line 15 to be supplied into the chamber C by controlling the degree of opening of a control valve 21. Examples of the control valve 21 include a metal diaphragm valve of a solenoid valve actuation type. The pressure-type flow rate control system 20 includes the control valve 21, a control circuit 22 that controls the degree of opening of the control valve 21, an orifice 23, pressure meters 24 and 25, and gas supply pipes 15a and 15b. The orifice 23 is provided between the gas supply pipes 15a and 15b. The gas supply pipe 15a extends from the orifice 23 to the control valve 21. The gas supply pipe 15b extends from the orifice 23 to a second valve VL2. The gas supply pipes 15a and 15b are connected to the gas supply line 15. The pressure-type flow rate control system 20 is an example of a pressure control flowmeter provided in a gas supply line.

It is assumed that the pressure inside the gas supply pipe 15a is $P_1$ and the volume of the gas supply pipe 15a is $V_1$. Furthermore, it is assumed that the pressure inside the gas supply pipe 15b is $P_2$ and the volume of the gas supply pipe 15b is $V_2$. When the pressure $P_1$ inside the gas supply pipe 15a and the pressure $P_2$ inside the gas supply pipe 15b in the pressure-type flow rate control system 20 are so controlled as to generally satisfy the critical expansion pressure condition of $P_1 > 2 \times P_2$, the flow rate Q of gas flowing through the orifice 23 is determined only by the pressure $P_1$ on the upstream side of the orifice 23, and is expressed by the following relational expression:

$$Q = CP_1. \tag{1}$$

The pressure-type flow rate control system 20 uses the above-described expression (1), and, by adjusting the pressure 21 with the control valve 21, controls the gas flow rate Q downstream of the orifice 23 to maintain a desired value that matches a process condition. In the above-described expression (1), C is a constant determined by the bore of the orifice 23 and gas temperature. Furthermore, the pressures $P_1$ and $P_2$ are measured with the pressure meters 24 and 25, respectively.

A first valve VL1 is disposed upstream (on the gas supply source 30 side) of the pressure-type flow rate control system 20 in the gas flow direction. The second valve VL2 is disposed downstream (on the semiconductor manufacturing apparatus 10 side) of the pressure-type flow rate control system 20 in the gas flow direction. The first valve VL1 and the second valve VL2 may be controlled to be fully open or fully closed.

In performing processes such as etching in the semiconductor manufacturing apparatus 10 of the above-described configuration, first, the wafer W is conveyed into the chamber C and loaded onto the loading table 12. The chamber C is evacuated to a vacuum. Gas output from the gas supply source 30 is introduced into the chamber C like a shower from the gas shower head 11. Predetermined high-frequency electric power output from the high-frequency power supply 13 is applied to the loading table 12.

Processing, such as plasma etching, is performed on the wafer W by the action of a plasma generated by dissociating and ionizing the introduced gas with the high-frequency electric power. After the end of the processing, the wafer W is conveyed out of the chamber C. The semiconductor manufacturing apparatus 10 is not limited to processing using a plasma, and may perform microfabrication on the wafer W by heat treatment, for example.

Next, a gas supply control method according to a comparative example is described with reference to FIGS. 2A through 2C, and thereafter, a gas supply control method according to this embodiment is described with reference to FIGS. 3A through 3C. According to the gas supply control method of the comparative example, the supply of gas is controlled by controlling the opening and closing of the valves depicted in FIG. 2A.

Figure 2A:
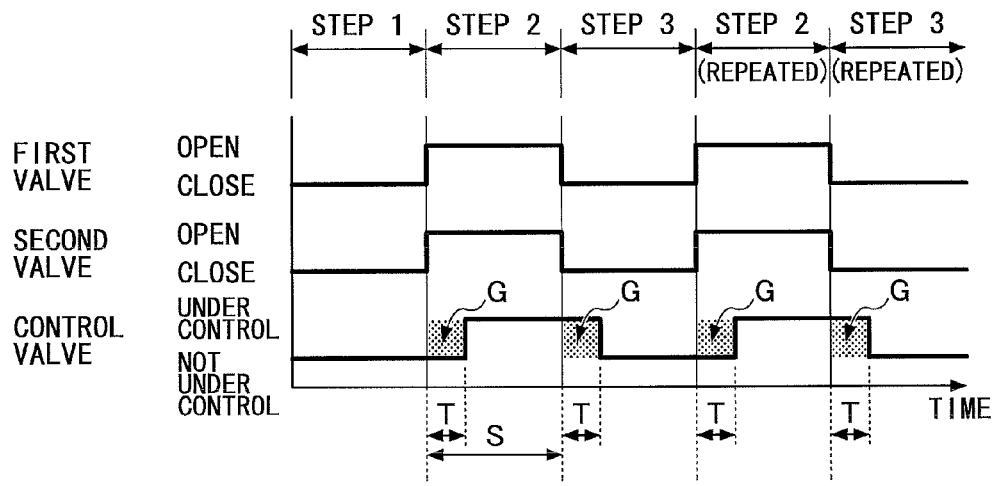
FIGS. 2A through 2C are charts depicting a gas supply control method and the flow rate of gas according to a comparative example.

In FIG. 2A, the horizontal axis represents time, and the vertical axis represents the state of control of each of the first valve VL1, the second valve VL2, and the control valve 21. In FIG. 2B, the horizontal axis represents time, and the vertical axis represents the pressures $P_1$ and $P_2$ of the pressure-type flow rate control system 20 (FCS). In FIG. 2C, the horizontal axis represents time, and the vertical axis represents the flow rate of gas flowing through the second valve VL2.

Each valve is controlled in the order of Step 1 to Step 2 to Step 3 to Step 2 to Step 3 . . . . Steps 2 and 3 are repeated a predetermined number of times.

The first valve VL1 and the second valve VL2 may be controlled to be fully open or fully closed. The degree of opening of the control valve 21 may be adjusted between being fully open and being fully closed. In FIG. 2A, OPEN indicates that the first valve VL1 and the second valve VL2 are fully open, and CLOSE indicates that that the first valve VL1 and the second valve VL2 are fully closed. Furthermore, when the control valve 21 is UNDER CONTROL (controlled), the degree of opening of the control valve 21 is controlled by the control circuit 22, so that gas is supplied at a flow rate corresponding to the degree of opening. When the control valve 21 is NOT UNDER CONTROL (not controlled), the control valve 21 is fully closed, so that a supply of gas is stopped.

The conditions of the valves at each step are illustrated below.

[Step 1]

At Step 1, the first valve VL1 and the second valve VL2 are controlled to be fully closed, and control of the control valve 21 is stopped, so that a supply of gas is stopped.

[Step 2]

At Step 2, the first valve VL1 and the second valve VL2 are controlled to be fully open, and thereafter, the control valve 21 is under control, so that a supply of gas is started.

The order in which the first valve VL1 and the second valve VL2 are opened may be either opening the first valve VL1 and the second valve VL2 simultaneously or opening the first valve VL1 after a predetermined period of time has passed from the opening of the second valve VL2. The control of the control valve 21 is performed after the opening of the first valve VL1 and the second valve VL2 is completed. Accordingly, the operation of controlling the control valve 21 is started after a predetermined time T has passed from when the opening of the first valve VL1 and the second valve VL2 is completed. The predetermined time T may be, but is not limited to, 200 ms according to the embodiment.

[Step 3]

At Step 3, the first valve VL1 and the second valve VL2 are controlled to be fully closed, and thereafter, the control of the control valve 21 is again stopped, so that a supply of gas is stopped.

Figure 2B:
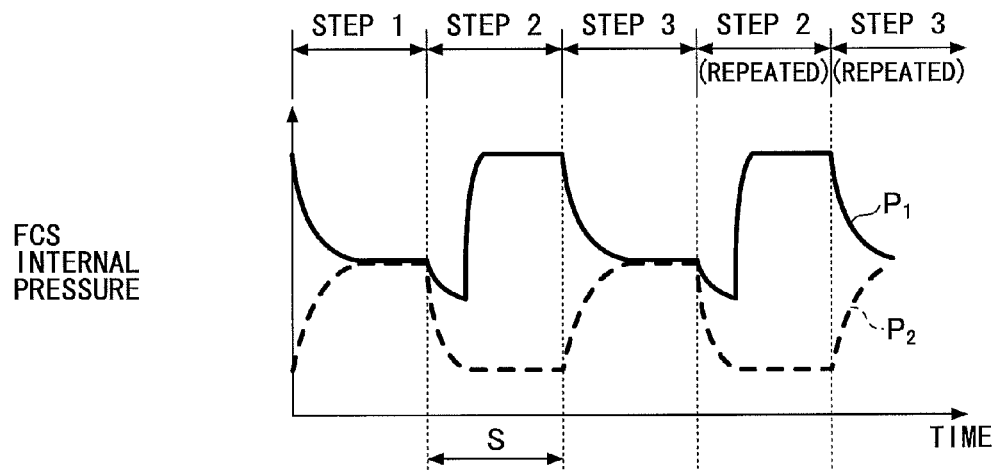
Figure 2C:
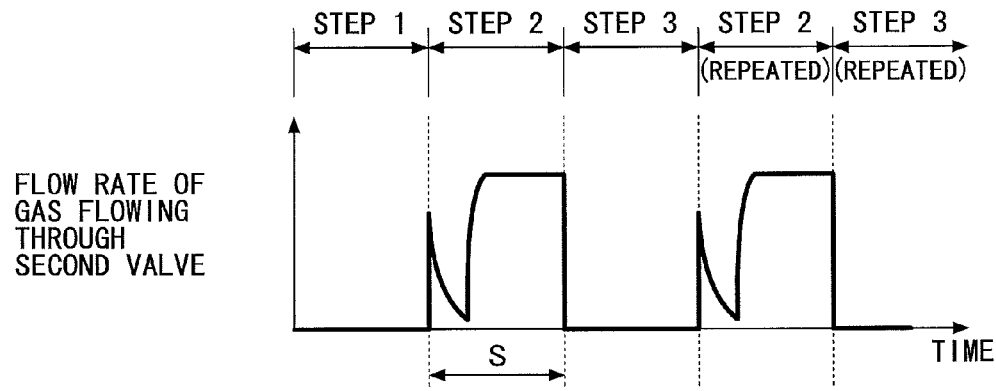

The pressures $P_1$ and $P_2$ of the pressure-type flow rate control system 20 depicted in FIG. 2B and the flow rate of gas flowing through the second valve VL2 depicted in FIG. 2C are described below with respect to the control of the valves at each of the above-described steps.

Before the supply of gas is stopped, the critical expansion pressure condition of $P_1 > 2 \times P_2$ is satisfied. Therefore, at Step 1, after the supply of gas is stopped, gas moves for an equilibrium in the gas supply pipes 15a and 15b. Accordingly, the pressure $P_1$ gradually decreases while the pressure $P_2$ gradually increases as depicted in FIG. 2B. Furthermore, no gas flows through the second valve VL2 as depicted in FIG. 2C.

At Step 2, first, the first valve VL1 and the second valve VL2 are controlled to be fully open. As a result, the pressures $P_1$ and $P_2$ temporarily decrease as depicted in FIG. 2B, and the flow rate of gas at the second valve VL2 decreases after gas remaining in the gas supply pipes 15a and 15b flows through the second valve VL2 as depicted in FIG. 2C. Thereafter, the control of the control valve 21 starts in the pressure-type flow rate control system 20 as depicted in FIG. 2A. Accordingly, the pressure $P_1$ increases as depicted in FIG. 2B, so that gas flows through the second valve VL2 at a desired flow rate.

When the control valve 21 is under control, the pressures $P_1$ and $P_2$ of the gas supply pipes 15a and 15b are controlled to constant values as depicted in FIG. 2B, and the flow rate of gas flowing through the second valve VL2 is controlled to a constant value as depicted in FIG. 2C. That is, when the control valve 21 is under control, the flow rate of gas supplied to the chamber C is controlled to a predetermined value.

At Step 3, after the first valve VL1 and the second valve VL2 are controlled to be fully closed, the control valve 21 is fully closed, so that a supply of gas is stopped. As a result, gas moves for an equilibrium in the gas supply pipes 15a and 15b. Consequently, the pressure $P_1$ gradually decreases while the pressure $P_2$ gradually increases as depicted in FIG. 2B. Furthermore, at Step 3, no gas flows through the second valve VL2 as depicted in FIG. 2C.

Figure 4:
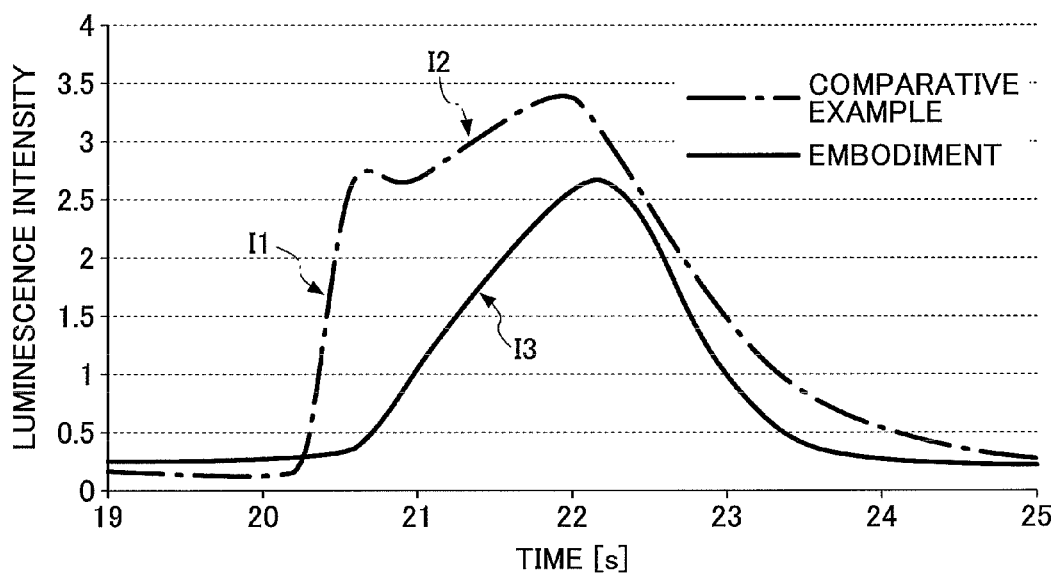
FIG. 4 is a graph depicting luminescence intensities due to gas according to the embodiment and the comparative example.

FIG. 4 depicts temporal changes in the flow rate of gas supplied into the chamber C by luminescence intensity in the chamber C. The temporal changes according to the comparative example are indicated by a one-dot chain line, and the temporal changes according to this embodiment are indicated by a solid line. Higher luminescence intensities indicate higher flow rates, and lower luminescence intensities indicate lower flow rates of gas.

According to the comparative example, as depicted at Step 2 of FIG. 2A, (a) the first valve VL1 and the second valve VL2 become fully open, and thereafter, (b) the control valve 21 gets controlled (under control). According to the comparative example, the supply of gas starts when the second valve VL2 is opened. Accordingly, during the predetermined time T between the opening of the first valve VL1 and the second valve VL2 and the start of the control of the control valve 21, gas G remaining in the gas supply pipes between the first valve VL1 and the second valve VL2 depicted in FIG. 2A flows through the second valve VL2 to be supplied into the chamber C. When the control of the control valve 21 starts, gas controlled to a predetermined flow rate flows through the second valve VL2 to be supplied into the chamber C. According to the comparative example, at Step 2, after the flow rate of gas supplied into the chamber C thus rises at two stages I1 and I2 because of the two-stage control of the above-described (a) and (b), the flow rate of gas is controlled to a predetermined value.

The height and the inclination of the rise of the flow rate of gas at the first stage I1 before the start of the control of the control valve 21 depicted in FIG. 4 are determined by the residual gas remaining in the pressure-type flow rate control system 20. The condition of this residual gas differs depending on the usage of the pressure-type flow rate control system 20 immediately before the start of a current supply of gas or a difference between the individual pressure-type flow rate control systems 20. Therefore, it is difficult to completely manage the rise of the flow rate of gas at the first stage I1. Accordingly, it is more difficult to completely manage the control of the waveform of luminescence intensity at the first stage I1, that is, the flow rate of gas at the first stage I1, in particular than to control the flow rate of gas at the second stage I2.

One method of eliminating the rise of the flow rate of gas at the first stage I1 is to reduce variations in the pressure $P_1$ while the supply of gas is stopped. A gas supply control method according to this embodiment is a measure to achieve such a method.

According to the gas supply control method of this embodiment, the second valve VL2 alone is used to control the flow rate of gas. This makes it possible to prevent a sharp change at the time of supplying gas in the chamber C, such as the rising of the flow rate of gas supplied into the chamber C at the above-described two stages I1 and I2.

Figure 3A:
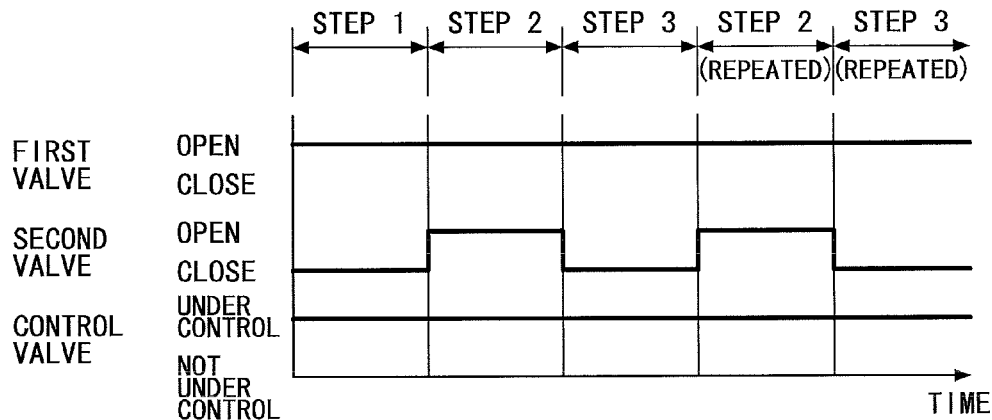
FIGS. 3A through 3C are charts depicting a gas supply control method and the flow rate of gas according to the embodiment.

Specifically, according to the gas supply control method of this embodiment, the valves are controlled as depicted in FIG. 3A. The conditions of the valves at each step are illustrated below.

[Step 1]

At Step 1, the first valve VL1 is controlled to be fully open, and the control valve 21 is under control. The second valve VL2 is controlled to be fully closed, so that a supply of gas is stopped.

[Step 2]

At Step 2, the first valve VL1 is controlled to be fully open, and the control valve 21 is kept under control. The second valve VL2 is controlled to be fully open, so that a supply of gas is started.

[Step 3]

At Step 3, the first valve VL1 is controlled to be fully open, and the control valve 21 is kept under control. The second valve VL2 is controlled to be fully closed, so that a supply of gas is stopped.

Figure 3B:
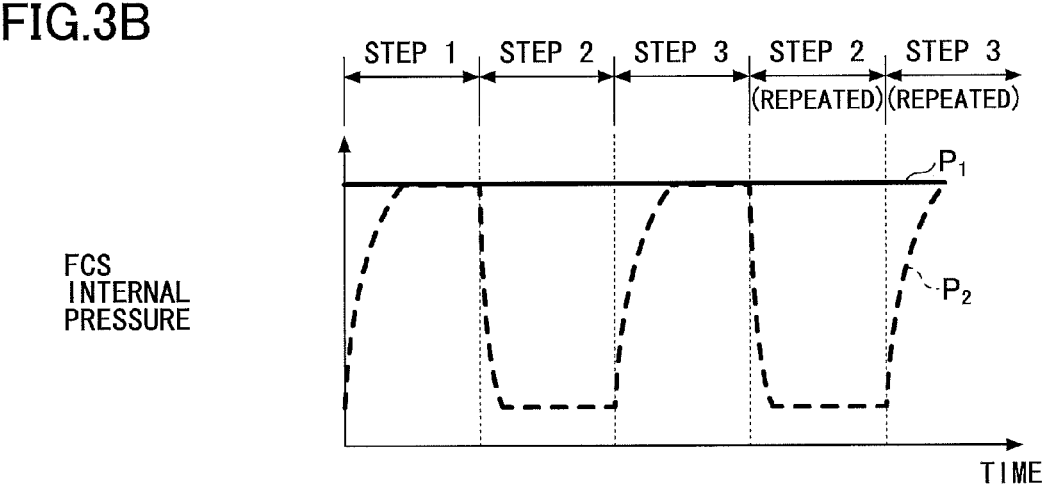
Figure 3C:
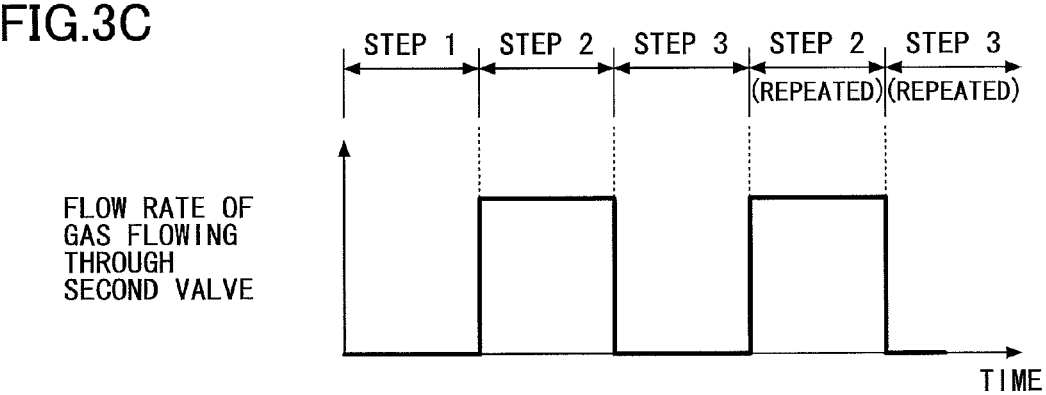

The pressures $P_1$ and $P_2$ of the pressure-type flow rate control system 20 depicted in FIG. 3B and the flow rate of gas flowing through the second valve VL2 depicted in FIG. 3C are described below with respect to the control of the valves at each of the above-described steps. According to this embodiment, the first valve VL1 is controlled to be open and the control valve 21 is kept under control at each step. Therefore, the pressure $P_1$ of the gas supply pipe 15a is constant.

Furthermore, according to this embodiment, the pressure $P_2$ of the gas supply pipe 15b and the flow rate of gas flowing through the second valve VL2 varies in accordance with the opening and closing of the second valve VL2. That is, at Step 1 of this embodiment depicted in FIG. 3A, because the second valve VL2 is closed, the pressure $P_2$ of the gas supply pipe 15b increases, and when reaching the same pressure as the pressure $P_1$, is maintained at the pressure as depicted in FIG. 3B. Furthermore, as depicted in FIG. 3C, no gas flows through the second valve VL2.

At Step 2, the second valve VL2 is opened, and in response to the opening of the second valve VL2, the pressure $P_2$ decreases to be maintained at a predetermined value. Furthermore, as depicted in FIG. 3, gas flows through the second valve VL2 at a predetermined flow rate.

At Step 3, the second valve VL2 is again closed, so that the pressure $P_2$ of the gas supply pipe 15b increases, and when reaching the same pressure as the pressure $P_1$, is maintained at the pressure as depicted in FIG. 3B. Furthermore, as depicted in FIG. 3C, no gas flows through the second valve VL2.

Thus, according to this embodiment, the flow rate of gas flowing through the second valve VL2 becomes constant in accordance with the opening and closing of the second valve VL2, so that gas is supplied to the chamber C at a controlled flow rate. This is because according to this embodiment, the first valve VL1 is controlled to be constantly fully open and the control valve 21 is controlled to be constantly under control, so that no uncontrollable gas remains in the pressure-type flow rate control system 20, thus making it possible to perform gas flow rate control that follows the opening and closing of the second valve VL2.

As described above, according to the gas supply control method of this embodiment, the first valve VL1 is constantly open and the control valve 21 is controlled to be constantly under control. As a result, when the second valve VL2 is opened to start supplying gas, part of the gas present on the downstream side of the orifice 23 that reduces conductance is smoothly supplied into the chamber C without going through the orifice 23. As a result, gas is supplied into the chamber C immediately after the start of a supply of gas, so that it is possible to eliminate the two-stage rising of the flow rate of gas as illustrated in the comparative example of FIG. 4.

According to the above-described gas supply control method, however, the pressures $P_1$ and $P_2$ are not prevented from varying. Accordingly, when the flow rate control is repeated (ON→OFF→ON→ . . . ) at very short intervals, the pressures $P_1$ and $P_2$ do not reach an equilibrium, so that it is difficult to avoid the two-stage rising.

Therefore, according to this embodiment, the ratio of the volume $V_1$ of the gas supply pipe 15a to the volume $V_2$ of the gas supply pipe 15b in the pressure-type flow rate control system 20 that employs the above-described gas supply control method, $V_1/V_2$, is set to an appropriate value. By executing the gas supply control method according to this embodiment using the pressure-type flow rate control system 20 whose ratio $V_1/V_2$ of the volumes $V_1$ and $V_2$ is set to an appropriate value, it is possible to completely avoid the two-stage rising of the flow rate of gas due to residual gas. The setting of the volume ratio $V_1/V_2$ of the gas supply pipes 15a and 15b to an appropriate value is described below.

According to this embodiment, the volume ratio $V_1/V_2$ of the gas supply pipes 15a and 15b is set to an appropriate value by causing a change in the arrangement of the orifice 23 in the pressure-type flow rate control system 20 and the control valve 21 and the second valve VL2 across the orifice 23. Specifically, while the volume ratio $V_1/V_2$ of the gas supply pipes 15a and 15b is 3/2 according to the comparative example, the arrangement of the control valve 21 and the second valve VL2 is changed so that the volume ratio $V_1/V_2$ of the gas supply pipes 15a and 15b is 9/1 or more according to this embodiment.

Figure 5:
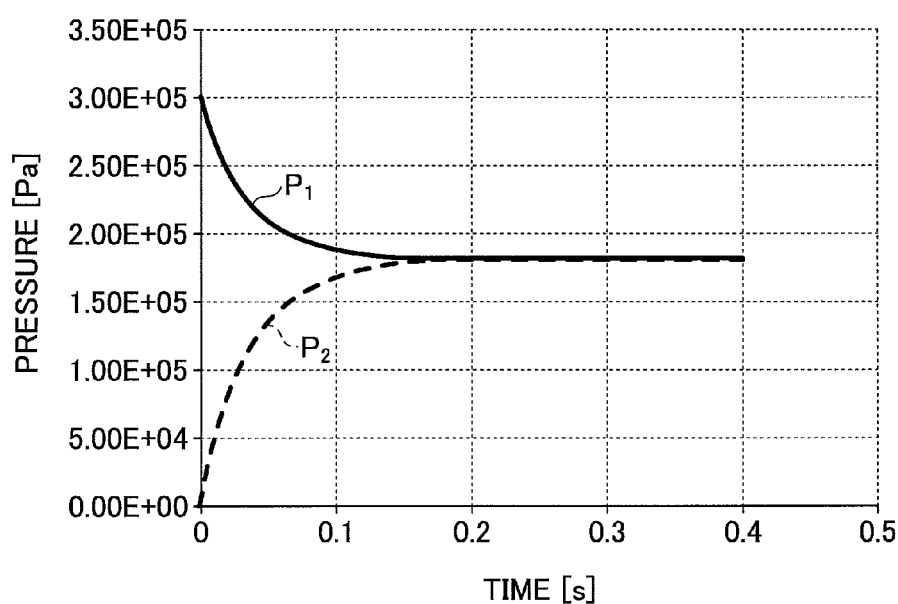
FIG. 5 is a graph depicting pressures at the volume ratio of gas supply pipes around an orifice according to the comparative example.

For example, the volume ratio $V_1/V_2$ of the gas supply pipes 15a and 15b is set to 3/2 on condition that the pressures $P_1$ and $P_2$ generally satisfy the critical expansion pressure condition of $P_1 > 2 \times P_2$. FIG. 5 depicts the states of the pressures $P_1$ and $P_2$ after the supply of gas is stopped, that is, after the control valve 21 and the second valve VL2 are closed, in this case. Referring to FIG. 5, the pressure $P_1$ of the gas supply pipe 15a greatly varies so that it takes time before the pressure $P_1$ becomes stable. As a result, a gas peak corresponding to the pressure $P_1$ after variation is generated during the control of starting and stopping a supply of gas, so that it is difficult to control the flow rate of gas. Furthermore, in the case of changing the flow rate of gas, it takes time before the pressure $P_1$ becomes stable.

Figure 6:
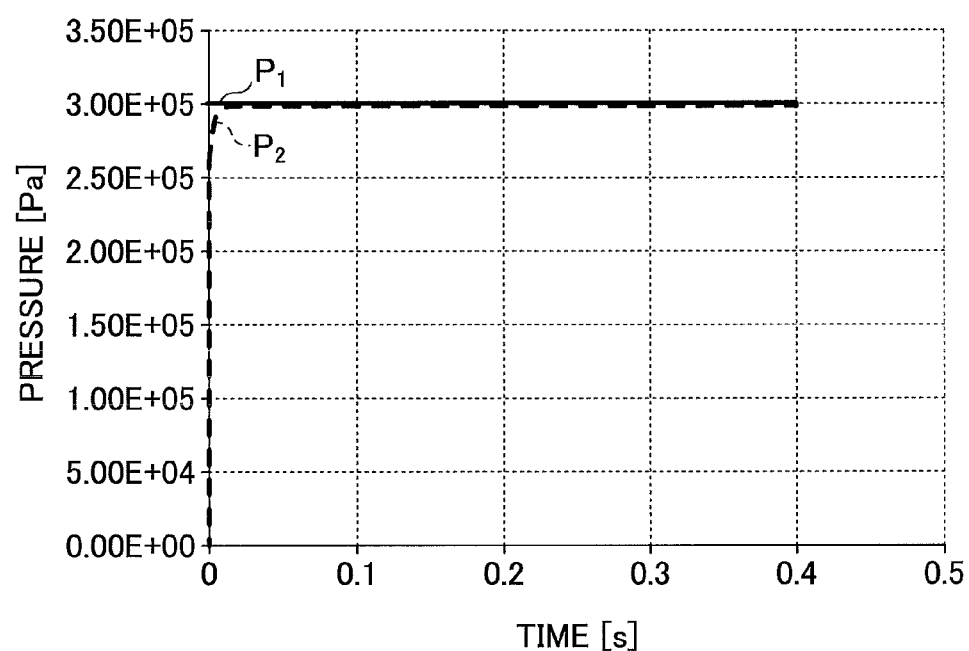
FIG. 6 is a graph depicting pressures at the volume ratio of the gas supply pipes around the orifice according to the embodiment.

On the other hand, the volume ratio $V_1/V_2$ of the gas supply pipes 15a and 15b is set to 90/1 on condition that the pressures $P_1$ and $P_2$ generally satisfy the critical expansion pressure condition of $P_1 > 2 \times P_2$. FIG. 6 depicts the states of the pressures $P_1$ and $P_2$ after a supply of gas is stopped, that is, after the control valve 21 and the second valve VL2 are closed, in this case. FIG. 6 shows that the pressure $P_1$ of the gas supply pipe 15a immediately becomes stable without a substantial variation. Furthermore, this indicates that it is possible to reduce the time before the pressure $P_1$ becomes stable when the flow rate of gas is changed.

A luminescence intensity curve 13 according to this embodiment depicted in FIG. 4 indicates luminescence intensity due to gas in the chamber C in the case where gas is supplied according to the gas supply control method of this embodiment using the pressure-type flow rate control system 20 in which the volume ratio $V_1/V_2$ of the gas supply pipes 15a and 15b is set to 90/1. The luminescence intensity curve 13 shows that by setting the volume ratio $V_1/V_2$ of the gas supply pipes 15a and 15b to 90/1, the time before the pressure $P_1$ becomes stable is reduced, so that gas is smoothly supplied into the chamber C after the supply of gas is started. As a result, it is possible to eliminate the two-stage rising of the flow rate of gas illustrated in the comparative example of FIG. 4.

Figure 7:
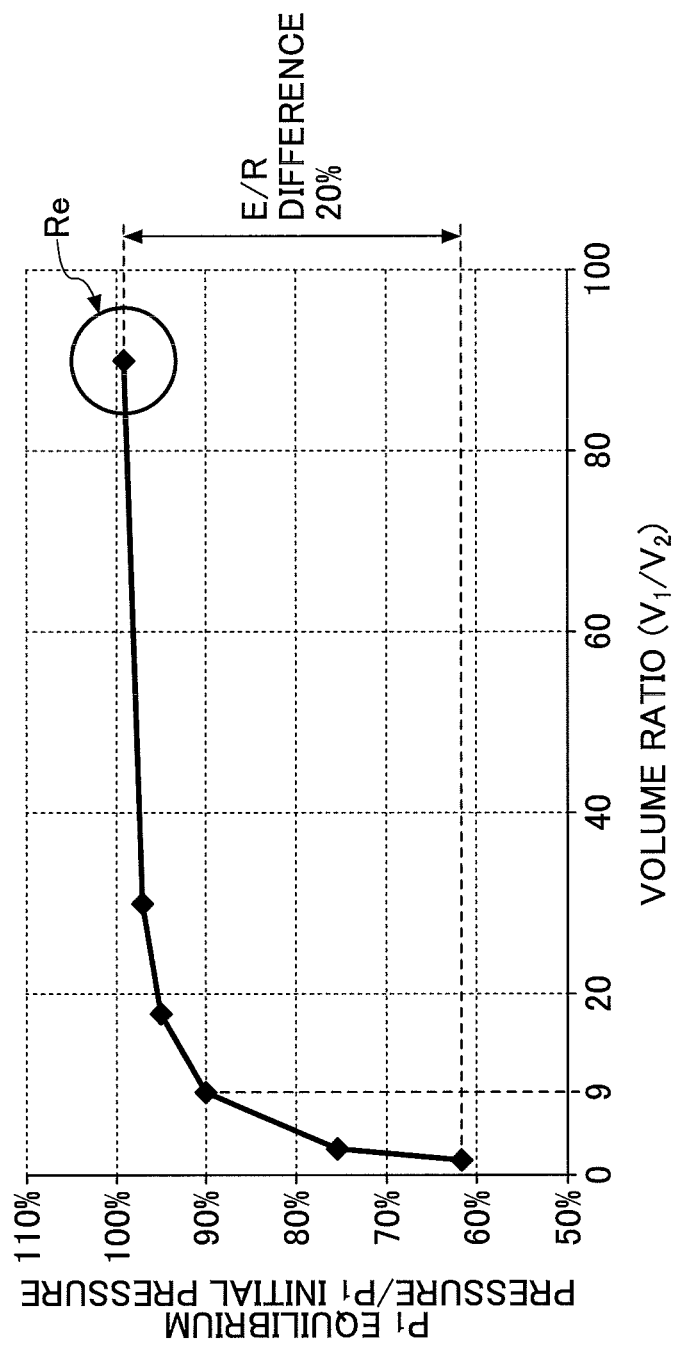
FIG. 7 is a graph depicting changes in the volume ratio of the gas supply pipes around the orifice and equilibrium pressures according to the embodiment.

FIG. 7 is a graph in which values in an equilibrium state (equilibrium values) of the pressure $P_1$ of the gas supply pipe 15a relative to its initial value in the case of changing the volume ratio $V_1/V_2$ of the gas supply pipes 15a and 15b are plotted. As illustrated above, the equilibrium value/initial value of the pressure $P_1$ in the case where the volume ratio $V_1/V_2$ of the gas supply pipes 15a and 15b is set to 90/1 shows a value that is approximate to 100% as indicated by Re in FIG. 7. Specifically, the plotted values depicted in FIG. 7 indicate that the equilibrium value/initial value of the pressure $P_1$ is 62% when the volume ratio $V_1/V_2$ is 1.5, 75% when the volume ratio $V_1/V_2$ is 3.0, 90% when the volume ratio $V_1/V_2$ is 9.0, 95% when the volume ratio $V_1/V_2$ is 18.0, 97% when the volume ratio $V_1/V_2$ is 30.0, and 99% when the volume ratio $V_1/V_2$ is 90.0.

At this point, there is a difference of 20% between an etch rate E/R in the case of performing etching in the chamber C with the volume ratio $V_1/V_2$ set to 90/1 and an etch rate E/R in the case of performing etching in the chamber C with the volume ratio $V_1/V_2$ set to 3/2.

Ideally, the volume ratio $V_1/V_2$ is set to 90/1 and a waveform rising at the two stages I1 and I2 illustrated in the comparative example of FIG. 4 is not observed. In order to prevent the etch rate E/R from differing from the etch rate E/R of this ideal case by more than 5%, preferably, the ratio of the equilibrium value of the pressure $P_1$ to its initial value is within the range of 90% to 100%. That is, the volume ratio $V_1/V_2$ of the gas supply pipes 15a and 15b is preferably set to 9/1 or more.

Figure 8:
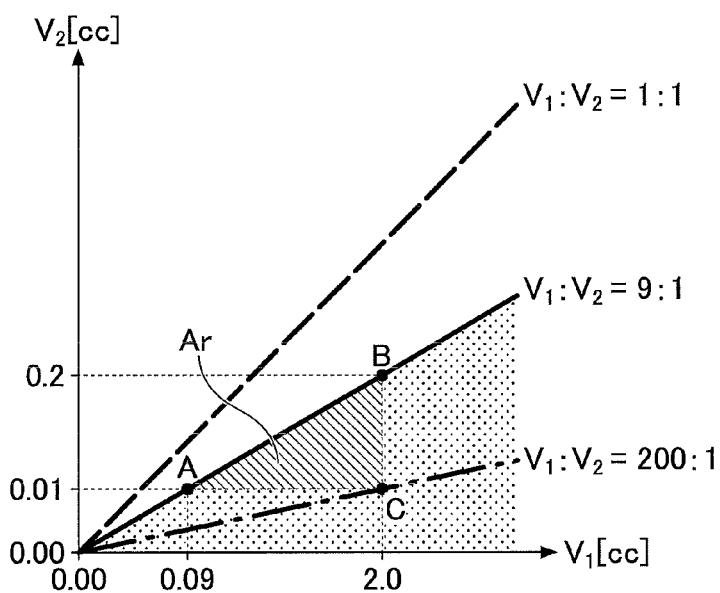
FIG. 8 is a graph depicting an appropriate range of the volume ratio of the gas supply pipes around the orifice according to the embodiment.

That is, the volumes $V_1$ and $V_2$ are preferably set so as to be within the (dotted and hatched) area of FIG. 8 where the volume ratio $V_1:V_2$ is 9:1 or more. Because of physical restrictions regarding the processing of the gas supply pipes 15a and 15b, however, the volumes $V_1$ and $V_2$ are preferably set so that the volume ratio $V_1:V_2$ is 200:1 or less. Practically, the volumes $V_1$ and $V_2$ may be set so that the volume $V_1$ falls within the range of 0.09 cc to 2.0 cc and the volume $V_2$ falls within the range of 0.01 cc to 0.2 cc with the volume ratio $V_1:V_2$ being more than or equal to 9:1 and less than or equal to 200:1. That is, an area Ar in FIG. 8 may be practically an effective range in the case of setting the volume ratio $V_1/V_2$.

As described above, according to this embodiment, the supply of gas to the chamber C and the stoppage of the supply of gas to the chamber C are controlled by the opening and closing of the second valve VL2 provided downstream of the orifice 23 in the pressure-type flow rate control system 20. In performing the control, in order to reduce a pressure change at the time of stopping a supply of gas due to a structure specific to the pressure-type flow rate control system 20, the ratio of the volume $V_2$ between the orifice 23 and the second valve VL2 downstream of the orifice 23 to the volume $V_1$ between the orifice 23 and the control valve 21 upstream of the orifice 23 is reduced by, for example, approximately one order of magnitude or more relative to the comparative example.

According to the above-described configuration, it is possible to promptly increase the flow rate of gas supplied into the chamber C to a predetermined value using the pressure-type flow rate control system 20. According to this embodiment, by thus improving the responsiveness of gas, it is possible to switch gases at high speed. That is, the gas supply control method using the pressure-type flow rate control system 20 according to this embodiment is effective in a process that repeats a supply of gas and the stoppage of a supply of gas at high speed (gas pulsing).

Furthermore, according to this embodiment, because the responsiveness of gas is improved, it is possible to reduce time before the flow rate of gas become stable in the chamber C, so that it is possible to improve throughput.

Figure 9:
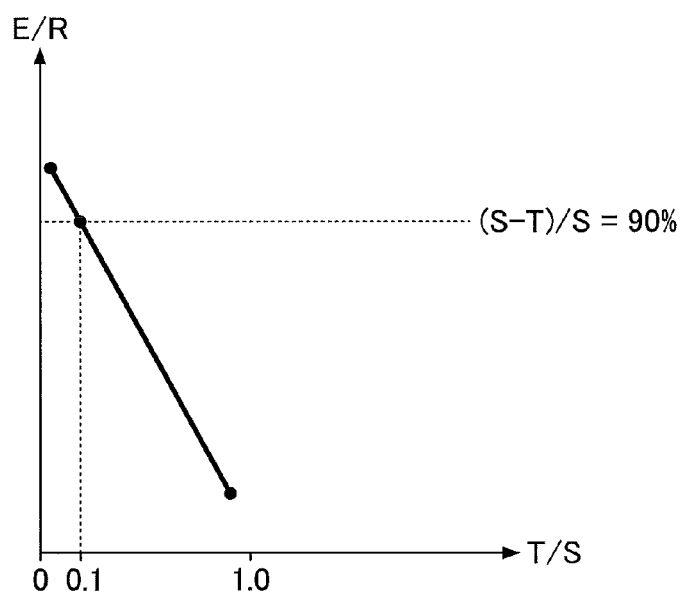
FIG. 9 is a graph depicting a relationship between a predetermined time T and an etch rate according to the embodiment.

When the above-described predetermined time T of FIG. 2A increases, the flow rate of gas supplied to the chamber C is stabilized, but an actual time for supplying gas in a valve open period for supplying gas is reduced. As a result, an increase in the predetermined time T decreases the etch rate. FIG. 9 depicts a relationship between the predetermined time T and the etch rate according to this embodiment. In FIG. 9, the horizontal axis represents the ratio of the predetermined time T to a time S of Step 2, T/S, and the vertical axis represents an etch rate (E/R) corresponding to T/S.

According to FIG. 9, as the predetermined time T increases, the etch rate decreases. When (S−T)/S is less than 90%, that is, when T/S is more than 0.1, a decrease in the etch rate becomes non-negligible. Accordingly, the predetermined time T is desired to be 1/10 or less of the time S of Step 2.

Furthermore, according to this embodiment, it is possible to swiftly stabilize the flow rate of gas supplied to the chamber C at a desired value after the supply of gas is started by controlling the second valve VL2. Therefore, by setting the matching box 13a in advance to a matching position after the stabilization of the flow rate, it is possible to control reflected waves of the high-frequency electric power output by the high-frequency power supply 13, so that it is possible to improve the stability of processing in the semiconductor manufacturing apparatus 10.

Furthermore, according to this embodiment, unlike the comparative example, no uncontrolled gas is introduced into the chamber C. Therefore, it is possible to eliminate variations in the supply of gas into the chamber C due to a difference between the individual pressure-type flow rate control systems 20 or a difference between the individual semiconductor manufacturing apparatuses 10, so that it is possible to perform stable processing in the semiconductor manufacturing apparatus 10.

Next, a rapid alternating process as an example of a process that repeats supplying gas and stopping supplying gas at high speed is described with reference to FIG. 10. According to the rapid alternating process depicted in FIG. 10, which uses the gas supply control method according to this embodiment, an etching process and a deposition process are alternately and rapidly executed. This, however, is an example of a rapid alternating process, and a process type is not limited to this. Furthermore, while the rapid alternating process is being executed, the first valve VL1 is controlled to be constantly open, and the control valve 21 is controlled to be constantly under control. The rapid alternating process depicted in FIG. 10 is controlled by the control circuit 22.

Figure 10:
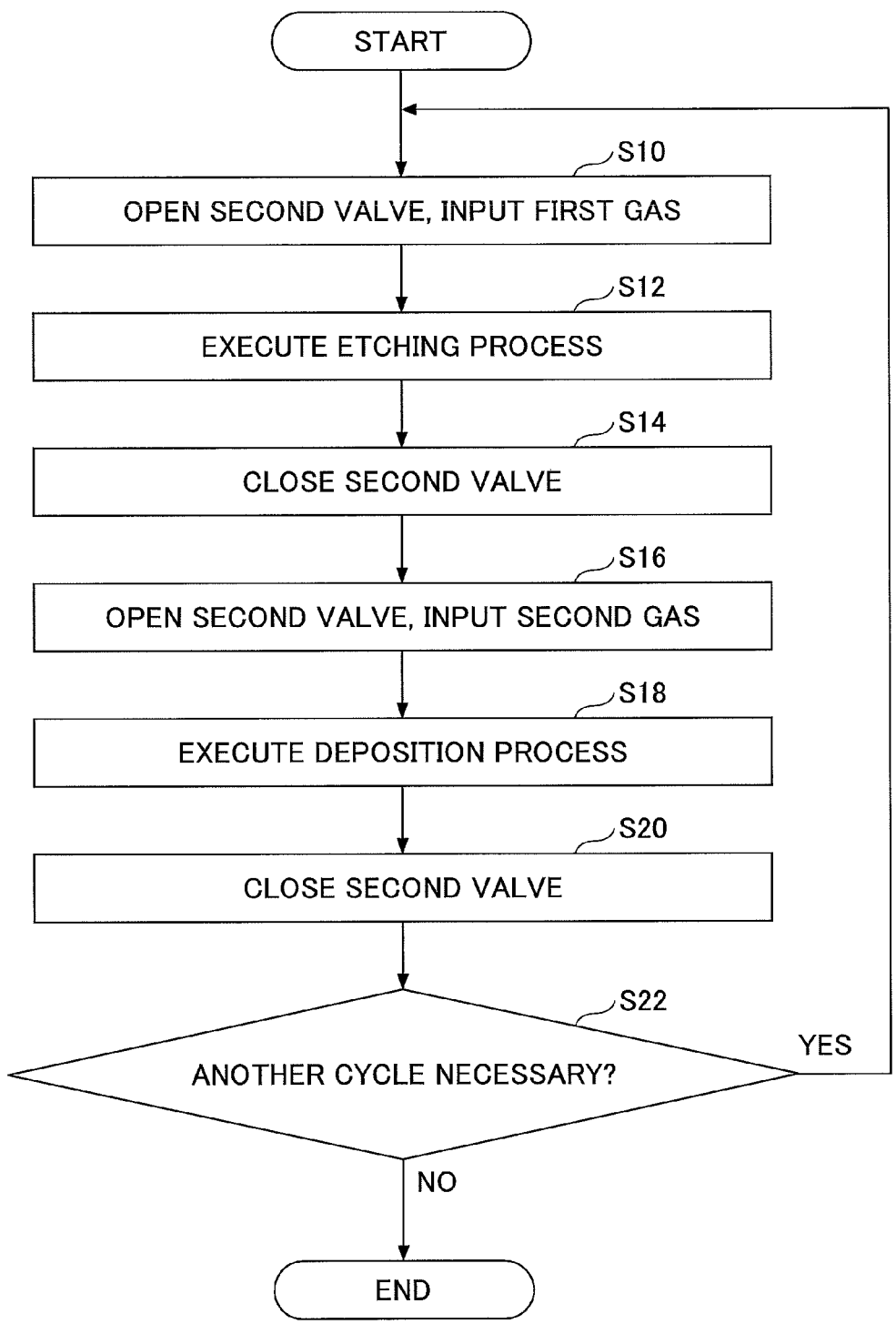
FIG. 10 is a flowchart depicting a rapid alternating process using a gas supply control method according to the embodiment.

When the process of FIG. 10 is started, first, at step S10, the second valve VL2 is controlled to be open, and a first gas is input. Next, at step S12, an etching process using the first gas is executed with application of high-frequency electric power. Next, at step S14, the second valve VL2 is controlled to be closed.

Next, at step S16, the second valve VL2 is controlled to be open, and a second gas is input. Next, at step S18, a deposition process using the second gas is executed with application of high-frequency electric power. Next, at step S20, the second valve VL2 is controlled to be closed.

Next, at step S22, it is determined whether another cycle of the rapid alternating process is necessary. If it is determined that another cycle of the rapid alternating process is necessary (YES at step S22), the process returns to step S10 to repeat the process of steps S10 through S22. If it is determined at step S22 that another cycle of the rapid alternating process is unnecessary (NO at step S22), the process ends.

According to the rapid alternating process of this embodiment, because gas is promptly supplied into the chamber C at a predetermined flow rate, following the control of the opening and closing of the second valve VL2, it is possible to achieve a good process. Furthermore, it is possible to eliminate a need to perform control in view of the time taken before gas reaches the chamber C. Thus, it is possible to effectively use the gas supply control method of this embodiment, which improves the responsiveness of gas, particularly in the rapid alternating process that repeats supplying gas and stopping supplying gas at high speed.

With respect to the allowable range of the predetermined time T relative to the time S of Step 2 of FIG. 2A, the etch rate (E/R) decreases as the predetermined time T increases (T/S becomes greater) as depicted in FIG. 9. When (S−T)/S is less than 90%, that is, when T/S is more than 0.1, a decrease in the etch rate becomes non-negligible. Accordingly, the predetermined time T is desired to be 1/10 or less of the time S of Step 2.

Figure 11A:
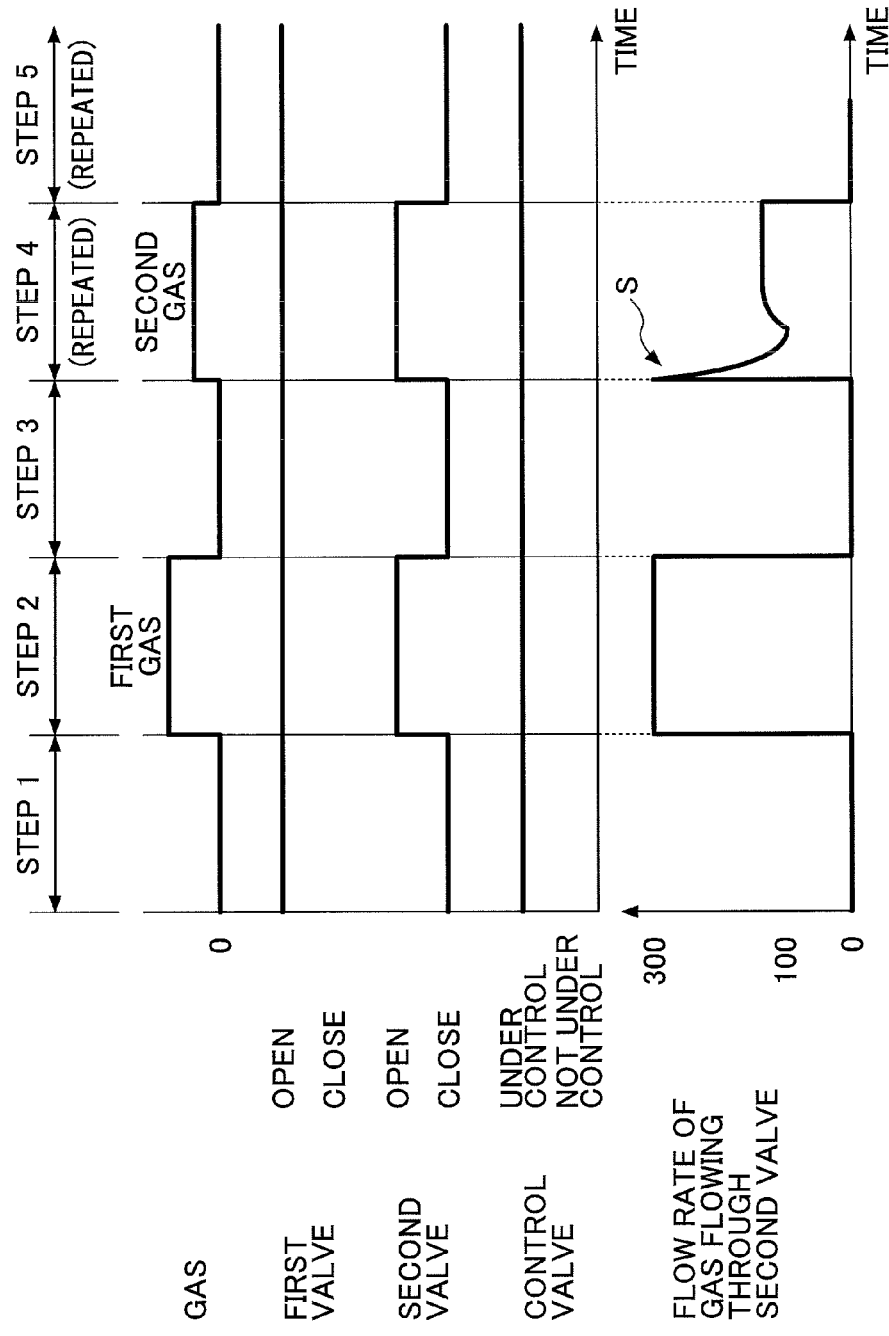
FIGS. 11A and 11B are charts for describing a gas supply control method according to a variation of the embodiment.
Figure 11B:
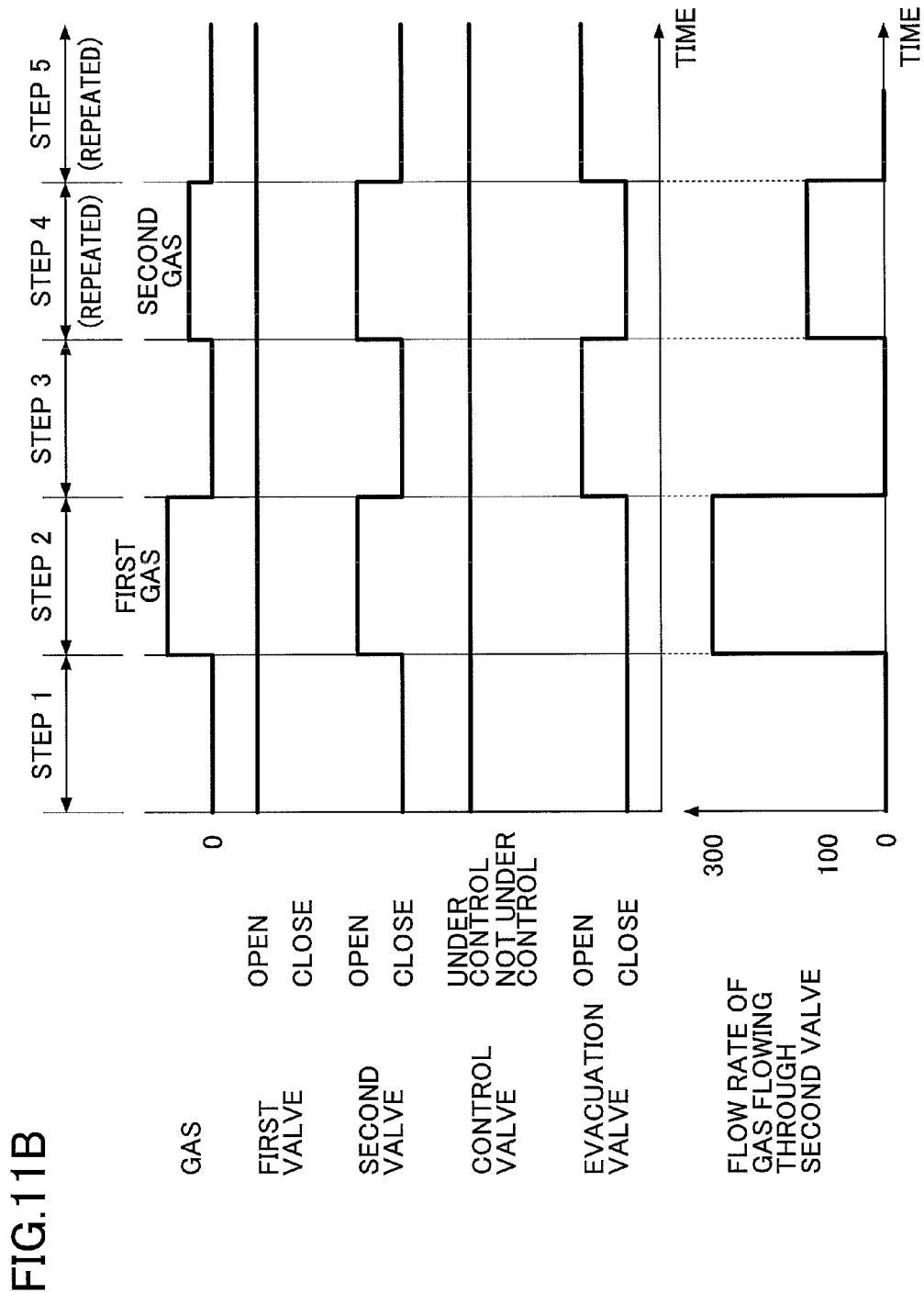
Figure 12:
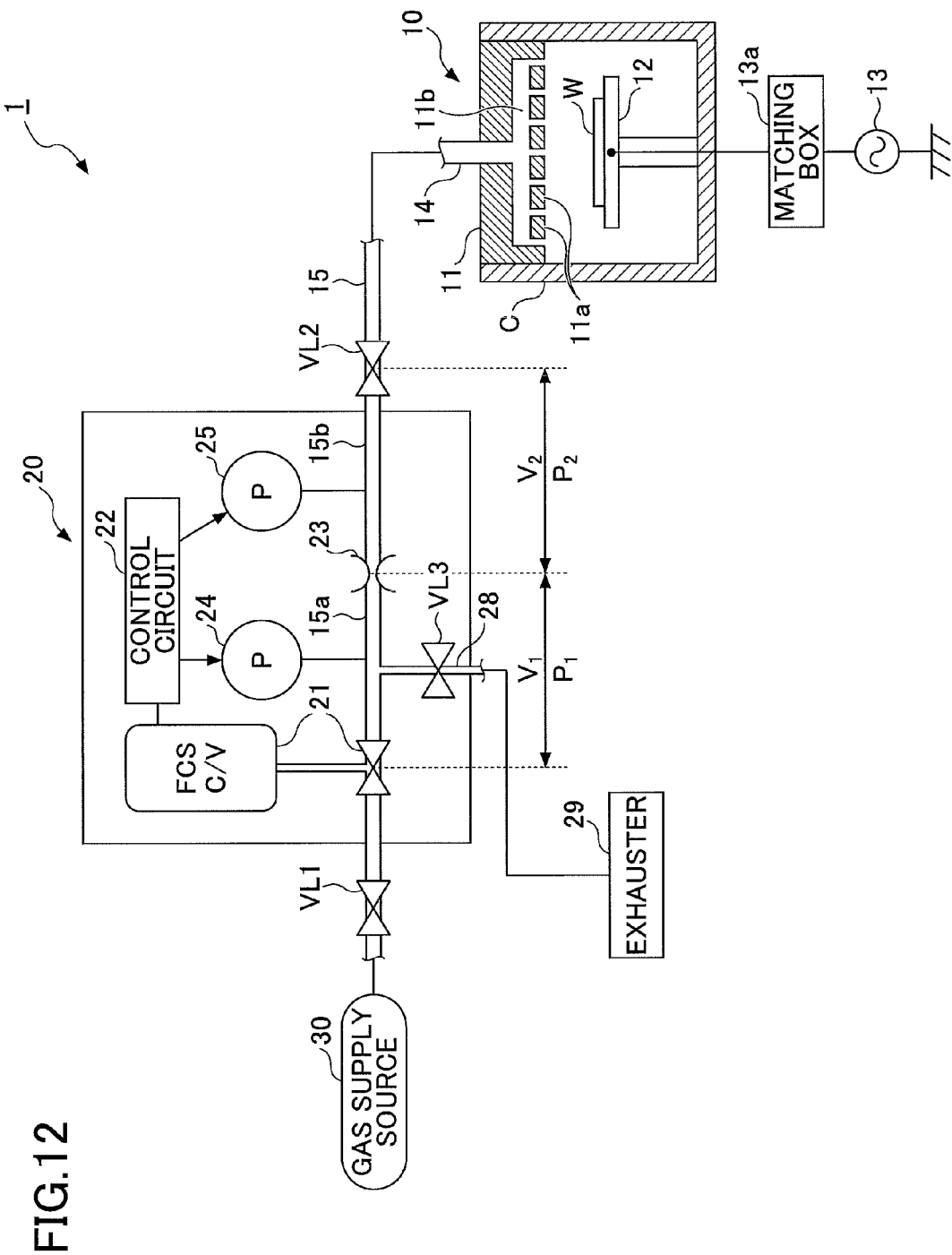
FIG. 12 is a diagram depicting an overall configuration of a gas supply control system according to the variation of the embodiment.

Next, a gas supply control method according to a variation of this embodiment is described with reference to FIGS. 11A, 11B and 12. FIGS. 11A and 11B are charts for describing a gas supply control method according to the variation of this embodiment. FIG. 12 is a diagram depicting an overall configuration of a gas supply control system according to the variation of this embodiment.

As described above, according to the gas supply control method of this embodiment, it is possible to improve stability and increase speed in a process in which gases are switched at high speed. As depicted in FIG. 11A, however, in the case of supplying a first gas at Step 2 subsequent to Step 1 and supplying a second gas at Step 4 after stopping a supply of the first gas at Step 3, a problem arises if the flow rate of the first gas is higher than the flow rate of the second gas. That is, at the beginning of Step 4 in which the second gas is caused to flow, the flow rate of gas flowing through the second valve VL2 becomes uncontrollable, so that a spike S is generated to deteriorate stability and controllability at the time of supplying gas. Letting the pressure inside the gas supply pipe 15a at Step 3, after completion of a supply of the first gas at Step 2, be $P_1$ and letting the pressure inside the gas supply pipe 15a, required to supply the second gas at Step 4, be $P_1'$, $P_1 > P_1'$ holds because the flow rate of the first gas is higher than the flow rate of the second gas. The same applies to the pressure inside the gas supply pipe 15b. Letting the pressure inside the gas supply pipe 15b at Step 3 be $P_2$ and letting the pressure inside the gas supply pipe 15b required at Step 4 be $P_2'$, $P_2 > P_2'$ holds. Accordingly, at the start of Step 4, gas of the pressure $P_1$ higher than the pressure $P_1'$ required to supply the second gas, trapped in the gas supply pipe 15a, and gas of the pressure $P_2$ higher than the pressure $P_2'$ required to supply the second gas, trapped in the gas supply pipe 15b, jet out. As a result, at the start of Step 4 immediately after a switch from Step 3 to Step 4, the flow rate of gas flowing through the second valve VL2 increases, thereby generating the spike S.

Therefore, according to the gas supply control system 1 of the variation of this embodiment, the gas supply pipe 15a between the control valve 21 and the orifice 23 is provided with an evacuation line 28 as depicted in FIG. 12. The evacuation line 28 is provided with an evacuation valve VL3, and gas exhaustion by an exhauster 29 connected to the evacuation line 28 is controlled by the opening and closing of the evacuation valve VL3.

Specifically, the evacuation valve VL3 is controlled to be open at Step 3 between Step 2 and Step 4. As a result, the gas supply pipes 15a and 15b are evacuated by the exhauster 29, so that the pressure $P_1$ of the gas supply pipe 15a at Step 3 is less than or equal to the pressure $P_1'$ of the gas supply pipe 15a at Step 4 ($P_1 \leq P_1'$) and the pressure $P_2$ of the gas supply pipe 15b at Step 3 is less than or equal to the pressure $P_2'$ of the gas supply pipe 15b at Step 4 ($P_2 \leq P_2'$). Therefore, even in the case where the flow rate of the first gas is higher than the flow rate of the second gas, the flow rate of gas flowing through the second valve VL2 is constant and the spike S is not generated at Step 4 at which the second gas is supplied as depicted in FIG. 11B. Thus, even in a process in which gas is supplied at different flow rates, it is possible to further improve stability and controllability at the time of supplying gas.

Next, a rapid alternating process according to the variation of this embodiment is described with reference to FIG. 13. According to the rapid alternating process depicted in FIG. 13, which uses the gas supply control method according to the variation of this embodiment, an etching process and a deposition process are alternately and rapidly executed. The rapid alternating process depicted in FIG. 13 is controlled by the control circuit 22.

Figure 13:
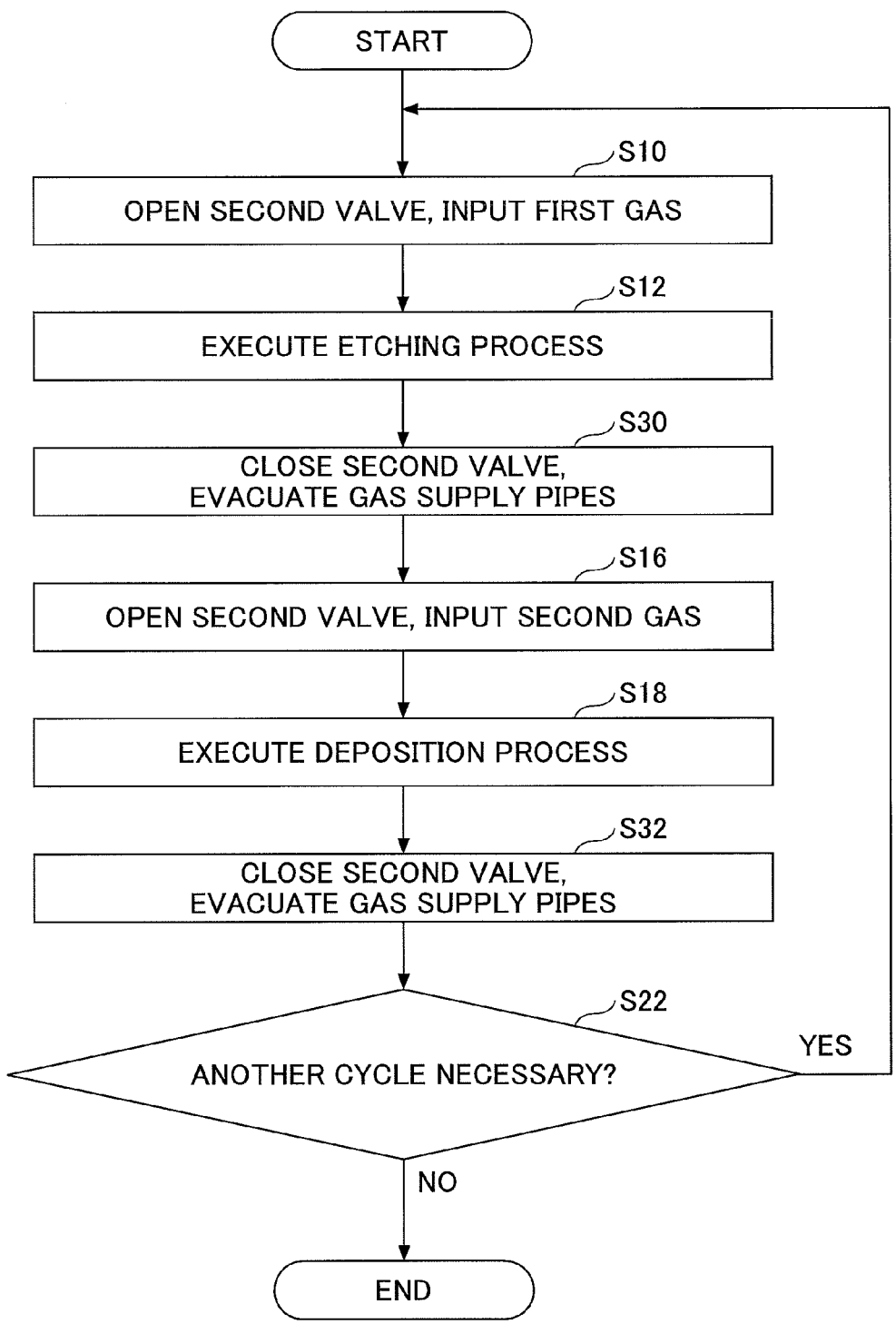
FIG. 13 is a flowchart depicting a rapid alternating process using the gas supply control system according to the variation of the embodiment.

When the process of FIG. 13 is started, first, at step S10, the second valve VL2 is controlled to be open, and a first gas is input. Next, at step S12, an etching process using the first gas is executed with application of high-frequency electric power. Next, at step S30, the second valve VL2 is controlled to be closed, and the gas supply pipes 15a and 15b are evacuated while there is no supply of gas.

Next, at step S16, the second valve VL2 is controlled to be open, and a second gas is input. Next, at step S18, a deposition process using the second gas is executed with application of high-frequency electric power. Next, at step S32, the second valve VL2 is controlled to be closed, and the gas supply pipes 15a and 15b are evacuated while there is no supply of gas.

Next, at step S22, it is determined whether another cycle of the rapid alternating process is necessary. If it is determined that another cycle of the rapid alternating process is necessary (YES at step S22), the process returns to step S10 to repeat the process of steps S10 through S22. If it is determined at step S22 that another cycle of the rapid alternating process is unnecessary (NO at step S22), the process ends.

According to the rapid alternating process of the variation of this embodiment, the opening and closing of the second valve VL2 is controlled and the gas supply pipes 15a and 15b are evacuated. As a result, also in the case where processes that are different in the flow rate of gas are successively performed, it is possible to promptly supply gas into the chamber C at a predetermined flow rate by discharging high-pressure gas through the evacuation line 28 while there is no supply of gas, even when the flow rate of gas supplied at the next step is low. Therefore, according to the rapid alternating process of the variation, stability and controllability in supplying gas are further improved, so that it is possible to achieve a good process. In particular, in a rapid alternating process that repeats supplying gas and stopping supplying gas at high speed, it is possible to effectively use the gas supply control method according to the variation of this embodiment that improves the responsiveness of gas.

Next, a variation of the rapid alternating process according to the variation of this embodiment is described with reference to FIG. 14. According to the rapid alternating process depicted in FIG. 14, which uses the gas supply control method according to the variation of this embodiment, an etching process and a deposition process are alternately and rapidly executed. The rapid alternating process depicted in FIG. 14 is controlled by the control circuit 22.

Figure 14:
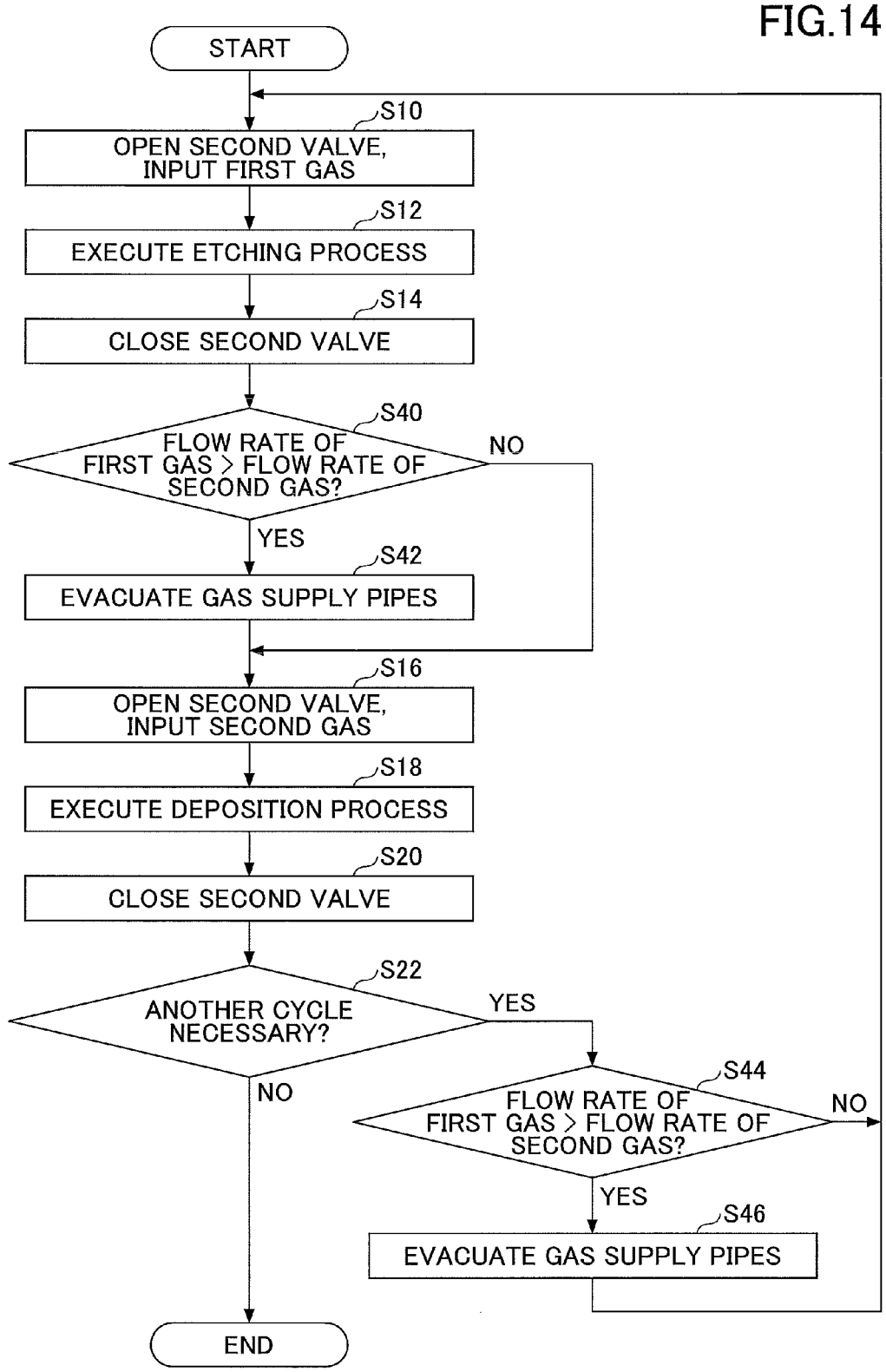
FIG. 14 is a flowchart depicting another rapid alternating process using the gas supply control system according to the variation of the embodiment.

When the process of FIG. 14 is started, first, at step S10, the second valve VL2 is controlled to be open, and a first gas is input. Next, at step S12, an etching process using the first gas is executed with application of high-frequency electric power. Next, at step S14, the second valve VL2 is controlled to be closed.

Next, at step S40, it is determined whether the flow rate of the first gas is higher than the flow rate of a second gas. If the flow rate of the first gas is higher than the flow rate of the second gas (YES at step S40), at step S42, the gas supply pipes 15a and 15b are evacuated while there is no supply of gas. If the flow rate of the first gas is lower than or equal to the flow rate of the second gas (NO at step S40), no evacuation is executed, and the process proceeds to step S16.

Next, at step S16, the second valve VL2 is controlled to be open, and the second gas is input. Next, at step S18, a deposition process using the second gas is executed with application of high-frequency electric power. Next, at step S20, the second valve VL2 is controlled to be closed.

Next, at step S22, it is determined whether another cycle of the rapid alternating process is necessary. If it is determined that another cycle of the rapid alternating process is necessary (YES at step S22), at step S44, it is determined whether the flow rate of the first gas is higher than the flow rate of the second gas. If the flow rate of the first gas is higher than the flow rate of the second gas (YES at step S44), at step S46, the gas supply pipes 15a and 15b are evacuated while there is no supply of gas, and thereafter, the process returns to step S10 to repeat the process at and after step S10. If the flow rate of the first gas is lower than or equal to the flow rate of the second gas (NO at step S44), no evacuation is executed, and thereafter, the process returns to step S10 to repeat the process at and after step S10.

On the other hand, if it is determined at step S22 that another cycle of the rapid alternating process is unnecessary (NO at step S22), the process ends.

According to the variation of the rapid alternating process of the variation of this embodiment, the gas supply pipes 15a and 15b are evacuated while no gas is supplied only when the flow rate of a first gas is higher than the flow rate of a second gas. Accordingly, in the case where processes that are different in the flow rate of gas are successively performed, gas is promptly supplied into the chamber C at a predetermined flow rate. Therefore, according to the variation of the rapid alternating process, stability and controllability in supplying gas are further improved, so that it is possible to achieve a good process. Furthermore, when the flow rate of a first gas is less than or equal to the flow rate of a second gas, it is predicted that the spike S is less likely to be generated, so that the gas supply pipes 15a and 15b are not evacuated at a step where no gas is supplied (for example, Step 3 in FIG. 11B). As a result, compared with the rapid alternating process depicted in FIG. 13, it is possible to reduce the time of Step 3 and increase throughput.

Gas supply control methods are described above based on the embodiments of the present invention. The present invention, however, is not limited to the specifically disclosed embodiments, and variations and modifications may be made without departing from the scope of the present invention. Configurations described in the embodiments may be combined to the extent that there is no inconsistency between the configurations.

Examples of semiconductor manufacturing apparatuses that may employ a gas supply control method according to an aspect of the present invention include capacitively coupled plasma (CCP) apparatuses, inductively coupled plasma (ICP) apparatuses, plasma processing apparatuses using a radial line slot antenna, helicon wave plasma (HWP) apparatuses, and electron cyclotron resonance (ECR) plasma apparatuses.

Furthermore, examples of substrates processed by a semiconductor manufacturing apparatus according to an aspect of the present invention include not only wafers but also large substrates for a flat panel display (FPD), electroluminescence (EL) elements, and substrates for a solar battery.

What is claimed is:

1. A gas supply control method using a pressure control flowmeter provided in a gas supply line, a first valve provided upstream of the pressure control flowmeter in the gas supply line, and a second valve provided downstream of the pressure control flowmeter in the gas supply line, wherein the pressure control flowmeter includes a control valve connected to the first valve and the second valve, and an orifice provided between the control valve and the second valve, the gas supply control method comprising:
   maintaining a first pressure of a first gas supply pipe between the orifice and the control valve and a second pressure of a second gas supply pipe between the orifice and the second valve so as to satisfy $P_1 > 2 \times P_2$, wherein $P_1$ is the first pressure and $P_2$ is the second pressure; and
   controlling a supply of gas by controlling opening and closing of the second valve with the first valve being open and the control valve being controlled,
   wherein a first volume of the first gas supply pipe and a second volume of the second gas supply pipe have a relationship of $V_1/V_2 \geq 9$, where $V_1$ is the first volume and $V_2$ is the second volume.

2. The gas supply control method as claimed in claim 1, wherein the first volume and the second volume have a relationship of $V_1/V_2 \leq 200$.

3. The gas supply control method as claimed in claim 1, further comprising:
   alternately executing a first process using a first gas and a second process using a second gas by alternately supplying the first gas and the second gas by controlling the opening and closing of the second valve with the first valve being open and the control valve being controlled.

4. The gas supply control method as claimed in claim 3, further comprising:
   evacuating the first gas supply pipe and the second gas supply pipe in a period when no gas is supplied between said supplying of the first gas and said supplying of the second gas.

5. The gas supply control method as claimed in claim 4, wherein said evacuating evacuates the first gas supply pipe and the second gas supply pipe in the period when no gas is supplied, when a flow rate of the first gas is higher than a flow rate of the second gas.

6. The gas supply control method as claimed in claim 3, further comprising:
   determining whether a flow rate of the first gas is higher than a flow rate of the second gas; and
   after supplying the first gas, evacuating the first gas supply pipe and the second gas supply pipe in a period when no gas is supplied between said supplying the first gas and said supplying the second gas in response to determining that the flow rate of the first gas is higher than the flow rate of the second gas, and supplying the second gas without evacuating the first gas supply pipe and the second gas supply pipe in the period when no gas is supplied in response to determining that the flow rate of the first gas is lower than or equal to the flow rate of the second gas.

* * * * *